(12) United States Patent
Nakano et al.

(10) Patent No.: US 7,208,946 B2
(45) Date of Patent: Apr. 24, 2007

(54) MAGNETIC MATERIAL DETECTING APPARATUS

(75) Inventors: Takahisa Nakano, Yokohama (JP); Masao Obama, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/485,364

(22) Filed: Jul. 13, 2006

(65) Prior Publication Data

US 2007/0013370 A1    Jan. 18, 2007

(30) Foreign Application Priority Data

Jul. 13, 2005    (JP) .............................. 2005-204670

(51) Int. Cl.
*G01N 27/72* (2006.01)
*G01R 33/12* (2006.01)

(52) U.S. Cl. ....................... 324/232; 324/228; 324/239

(58) Field of Classification Search ................ 324/228, 324/232, 239
See application file for complete search history.

(56) References Cited

U.S. PATENT DOCUMENTS 7,012,424 B2    3/2006    Obama et al.

FOREIGN PATENT DOCUMENTS

| JP | 07-210833 | 8/1995 |
|---|---|---|
| JP | 2002-042203 | 2/2002 |
| JP | 2004-054911 | 2/2004 |
| JP | 2005-241594 | 9/2005 |

*Primary Examiner*—Bot LeDynh
(74) *Attorney, Agent, or Firm*—Pillsbury Winthrop Shaw Pittman, LLP

(57) ABSTRACT

A pair of cores are arranged such that first end portions thereof face to each other with a gap via a conveying path through which a medium to be detected passes. Coils wound at the first end portions of the cores, respectively, are connected in series to each other, thereby constituting a first coil. Coils wound at second end portions on a side opposite to the first end portions are connected in series to each other, thereby constituting a second coil. There are provided an exciting coil which generates a detection magnetic field passing the cores and the gap, and a convergent magnetic field generating unit which generates, in the gap, a convergent magnetic field for converging the detection magnetic field in a direction perpendicular to a direction in which the first end portions of the cores are connected to each other.

13 Claims, 9 Drawing Sheets

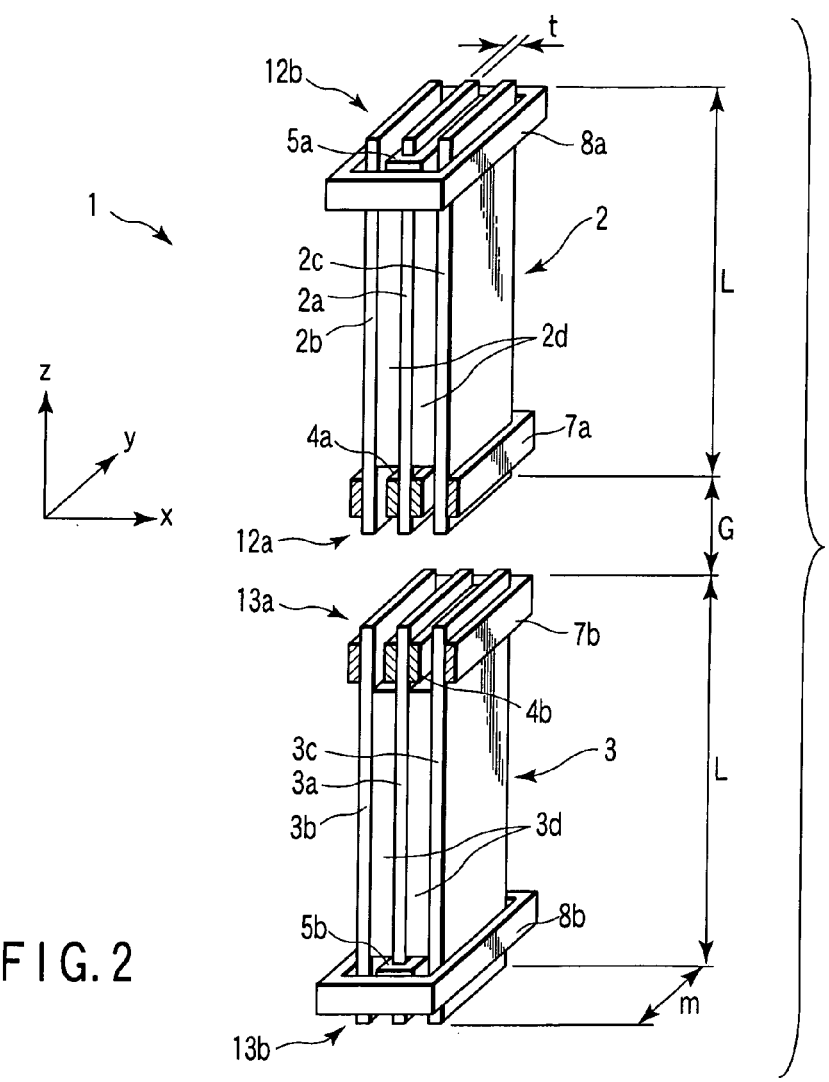
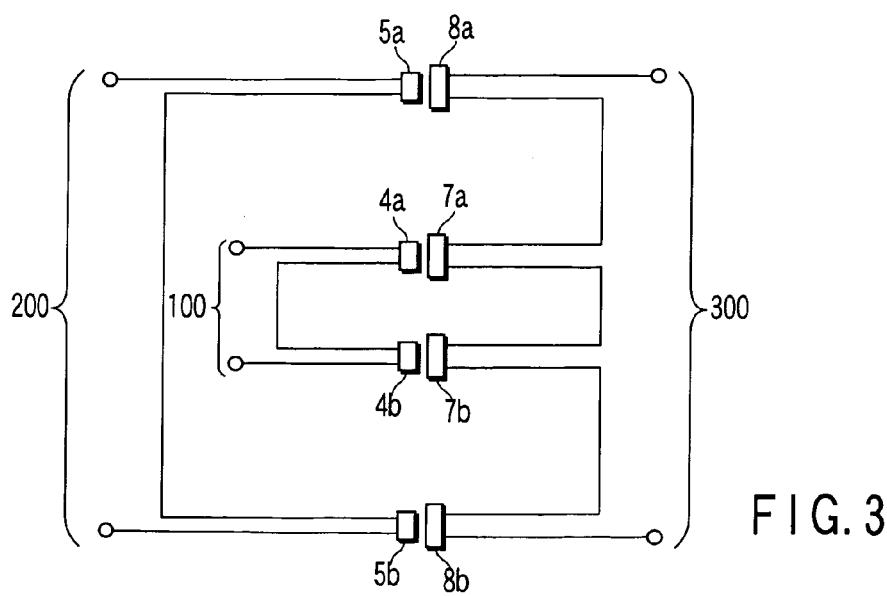
FIG. 2
FIG. 3

MAGNETIC MATERIAL DETECTING APPARATUS

CROSS-REFERENCE TO RELATED APPLICATIONS

This application is based upon and claims the benefit of priority from prior Japanese Patent Application No. 2005-204670, filed Jul. 13, 2005, the entire contents of which are incorporated herein by reference.

BACKGROUND OF THE INVENTION

1. Field of the Invention

The present invention relates to a magnetic material detecting apparatus for detecting in a non-contact manner a fine quantity of magnetic material contained in ink for use in printing on, for example, paper sheets or the like.

2. Description of the Related Art

There has been widely known a method for identifying paper sheets or the like by detecting a magnetic material contained in a printing ink for use in printing on the sheets or the like. A differential coil type transformer system has been conventionally known as a method for detecting a magnetic material contained in a printing ink. In this system, a primary coil is wound around a center of an S-shaped core; secondary coils are wound on the side of two openings formed with small gaps, respectively; a paper sheet or the like is allowed to pass over one of the two openings; and thus, a difference in induced voltages generated by the two secondary coils is output. In addition, there has been known a method for defining a small gap at a part of an annular core on which a coil is wounded, and detecting a change in induced voltage of the annular core when a paper sheet or the like passes through the gap.

Jpn. Pat. Appln. KOKAI Publication No. 2002-42203 discloses a magnetic material detecting apparatus comprising a pair of I-shaped cores each having coils wound at both ends in a longitudinal direction, the cores being arranged in a manner facing to each other at one end thereof with a gap. The coils arranged at the ends on the facing side of the pair of cores and the coils arranged at the ends on the other side of the cores are connected in series to each other, respectively, thereby forming the two coils. A magnetic material passing between the cores is detected in a non-contact manner by detecting a difference in induced voltages generated in the two coils.

Jpn. Pat. Appln. KOKAI Publication No. 2004-54911 discloses a magnetic material detecting apparatus comprising I-shaped cores which are arranged in a manner facing to each other at one end thereof with a gap. A primary core is arranged at a center of each core, and secondary coils are arranged at ends on a facing side of the cores and at ends on the other side, respectively. The coils arranged at the ends on the facing side are connected to in series each other, and the coils arranged at the ends on the other side are connected in series to each other. A differential arithmetic circuit produces a magnetic signal in response to a difference in coil signal at both of the ends. Consequently, it is possible to reduce an adverse influence between adjacent cores in a plurality of pairs of core arrays.

In the above-described magnetic material detecting apparatuses, paper sheets or the like are allowed to pass through the gap defined between the magnetic cores arranged opposing to each other, thereby detecting a magnetic material. With the above-described configuration, the detection sensitivity to the magnetic material is inconstantly varied in accordance with a position in the gap through which the sheets or the like pass. That is, the detection sensitivity is stable in the vicinity of the center of the gap, and in contrast, the detection sensitivity becomes higher as the sheets or the like approach one of the magnetic cores.

In the magnetic material detecting apparatuses disclosed in Jpn. Pat. Appln. KOKAI Publication Nos. 2002-42203 and 2004-54911, a signal output generated when the sheet or the like passes near an end surface of the magnetic core has tended to become greater by about 50% than a signal output generated when the sheet or the like passes the center of the gap.

BRIEF SUMMARY OF THE INVENTION

The present invention has been contrived in consideration of the above circumstances, and its object is to provide a non-contact type magnetic material detecting apparatus in which detection sensitivity is hardly varied in accordance with a position in a gap defined between magnetic cores.

According to an aspect of the invention, there is provided a magnetic material detecting apparatus comprising: a pair of cores each having a first end portion and a second end portion on a side opposite to the first end portion, the first end portions facing to each other with a gap through which a medium to be detected passes; a first coil including a pair of coils wound around the first end portion of each core and connected in series to each other; exciting means for generating a detection magnetic field which passes the pair of cores and the gap; a convergent magnetic field generating unit which generates, in the gap, a convergent magnetic field for converging the detection magnetic field in a direction perpendicular to a direction in which the first end portions of the pair of cores are connected to each other; and a signal processing circuit which processes a detection signal from the first coil.

According to another aspect of the invention, there is provided a magnetic material detecting apparatus comprising: a plurality of detecting units arranged in parallel to one another in a direction perpendicular to a conveying direction of a medium to be detected; each of the detecting units comprising: a pair of cores each having a first end portion and a second end portion on a side opposite to the first end portion, the first end portions facing to each other with a gap through which a medium to be detected passes; a first coil wound around the first end portion of each core and having a pair of coils connected in series to each other; exciting means for generating a detection magnetic field which passes the pair of cores and the gap; a convergent magnetic field generating unit which generates, in the gap, a convergent magnetic field for converging the detection magnetic field in a direction perpendicular to a direction in which the first end portions of the pair of cores are connected to each other; and a signal processing circuit which processes a detection signal from the first coil, the detecting units being juxtaposed in such a manner that lines connecting the first end portions of the pair of cores in each detecting unit are aligned substantially in parallel to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 2 is a perspective view showing the contour of a core constituting a detecting unit in the magnetic material detecting apparatus;

FIG. 3 is a diagram schematically illustrating the connection relationship between coils in the detecting unit;

DETAILED DESCRIPTION OF THE INVENTION

A non-contact type magnetic material detecting apparatus according to embodiments of the present invention will now be described in detail with reference to the accompanying drawings.

Figure 1:
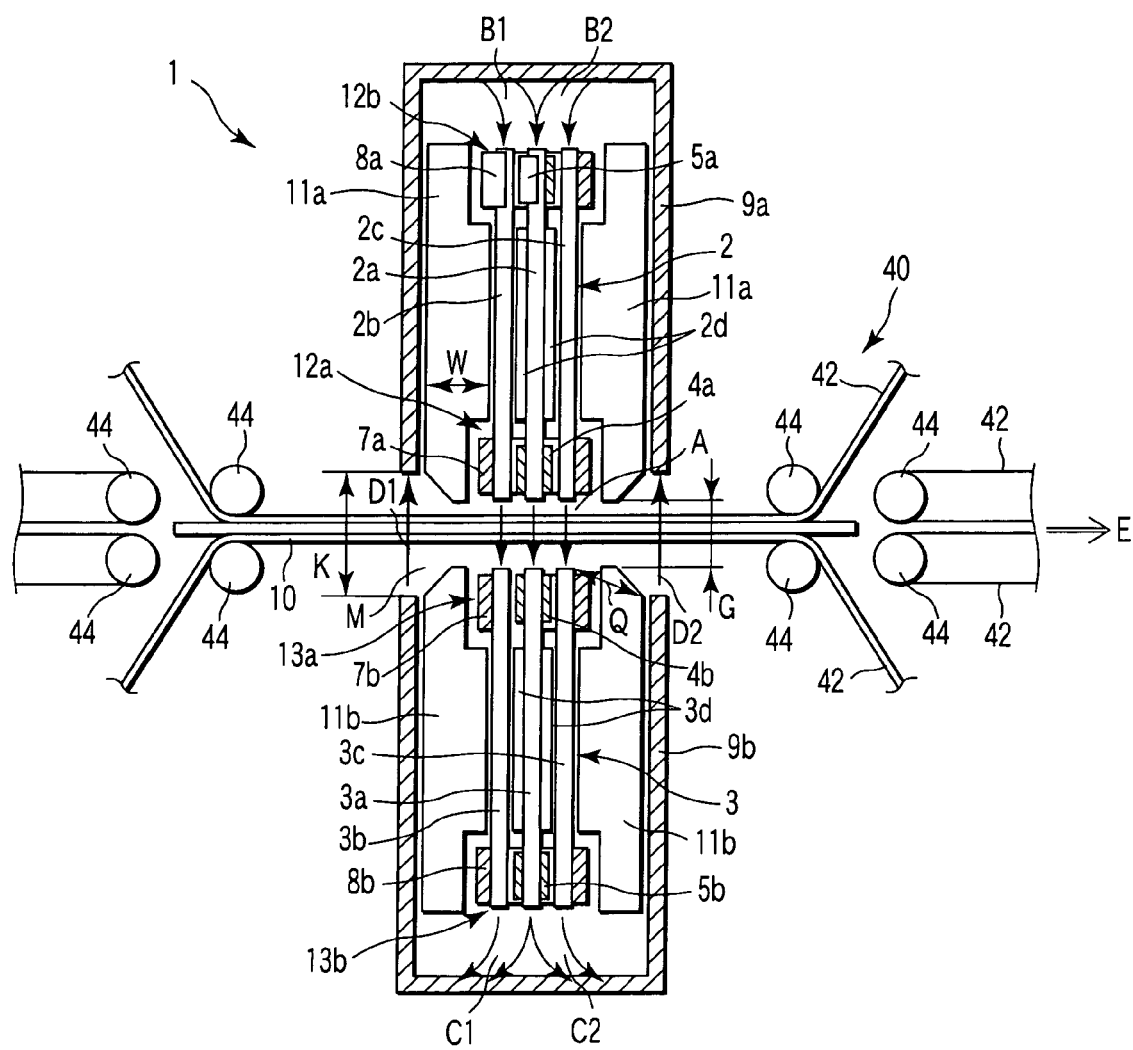
FIG. 1 is a cross-sectional view schematically showing a magnetic material detecting apparatus according to a first embodiment of the present invention.

As shown in FIGS. 1 and 2, a magnetic material detecting apparatus according to a first embodiment of the invention is configured in the form of, for example, a magnetic material detecting apparatus for detecting in non-contact manner a fine quantity of a magnetic material contained in a printing ink for use in printing on paper sheets or the like of printed matter. The magnetic material detecting apparatus comprises a detecting unit 1. The detecting unit 1 includes a pair of cores 2 and 3, pairs of coils 4a and 4b, 5a and 5b, 7a and 7b, and 8a and 8b wound around the cores 2 and 3, respectively, and magnetic covers 9a and 9b. A sheet 10 or the like of printed matter or a negotiable instrument as a medium to be detected which has been subjected to a printing operation with a printing ink containing magnetic powder, is conveyed in a movement direction E through a conveying path M by a conveying mechanism 40.

The conveying mechanism 40 includes a plurality of conveying belts 42, a plurality of conveying pulleys 44 for driving the belts, a drive unit (not shown) for driving the conveying pulleys, and the like. The conveying belts 42 travel while holding the sheet 10 or the like at both ends from above and below in a longitudinal direction, thereby conveying the sheet 10 or the like in the movement direction E.

Each of the cores 2 and 3 is constituted by alternately laminating three plate-shaped cores and plate-shaped insulting members each of which is held between the cores, in parallel to each other. The core 2 has a detecting core 2a positioned at the center and two converging cores 2b and 2c positioned on both sides of the detecting core 2a. Each of the detecting core 2a and the converging cores 2b and 2c is formed into an elongated and rectangular plate in the same size. In the present embodiment, each of the detecting core 2a and the converging cores 2b and 2c is constituted by laminating amorphous foils made of a soft magnetic material such as an iron-cobalt alloy, and further, is formed into a rectangular plate having a length L, a width m and a thickness t.

Insulting members 2d are held between the detecting core 2a and the converging core 2b and between the detecting core 2a and the converging core 2c, respectively. In this manner, the detecting core 2a and the converging cores 2b and 2c are arranged in parallel to one another with intervals kept thereamong. Each of the insulting members 2d is formed into an elongated and rectangular plate in a length shorter than those of the detecting core and the converging core. Therefore, both ends of the detecting core 2a and both ends of each of the converging cores 2b and 2c extend beyond the insulting members 2d in a manner facing to each other with the intervals.

The core 3 is constituted in the same manner as the core 2: namely, it has a detecting core 3a, converging cores 3b and 3c and two insulting members 3d, each of which is formed into a rectangular plate.

In the core 2, each of the detecting core 2a and the converging cores 2b and 2c has a first end portion 12a positioned at one end in a longitudinal direction and a second end portion 12b positioned on a side opposite to the first end portion 12a. In the core 3, each of the detecting core 3a and the converging cores 3b and 3c has a first end portion 13a positioned at one end in a longitudinal direction and a second end portion 13b positioned on a side opposite to the first end portion 13a.

The cores 2 and 3 are arranged such that the first end portion 12a of each of the detecting core 2a and the converging cores 2b and 2c and the first end portion 13a of the detecting core 3a and the converging cores 3b and 3c face to each other while holding the conveying path M therebetween, that is, they are arranged in a manner facing to each other with a gap G through which the sheet 10 or the like passes. The cores 2 and 3 are arranged along a direction perpendicular to the surface of the sheet 10 or the like, and in this case, they are arranged along a vertical direction. At the same time, the cores 2 and 3 are perpendicular, in the width direction Y thereof, to the movement direction E of the sheet 10 or the like, and further, are arranged so as to be positioned in parallel to the surface of the sheet 10 or the like. Consequently, the pair of cores 2 and 3 are aligned in parallel to each other.

The coils 4a and 4b are wound around the first end portions of the central detecting cores 2a and 3a, respectively, and the coils 5a and 5b are wound around the second end portions of the detecting cores 2a and 3a, respectively. As illustrated in FIG. 3, the coils 4a and 4b at the first end portions are connected in series to each other, thereby constituting a first coil 100. The coils 5a and 5b at the second end portions are connected in series to each other, thereby constituting a second coil 200.

As shown in FIGS. 1 and 2, in the core 2, the coil 7a is wound at the first end portion of the converging cores 2c and 2b, and a coil 8a is wound at the second end portion of the converging cores 2c and 2b. In the core 3, the coil 7b is wound at the first end portion around the converging cores 3c and 3b, and a coil 8b is wound at the second end portion around the converging cores 3c and 3b. As illustrated in FIG. 3, the coils 7a, 7b, 8a and 8b are connected in series to each other, thereby constituting an exciting coil 300 functioning as exciting means.

As shown in FIG. 1, the magnetic covers 9a and 9b are made of a magnetic material, and are provided so as to surround at least the second end portions of the cores 2 and 3, the coils 5a and 5b, and the coils 8a and 8b, respectively. In this manner, the magnetic covers 9a and 9b can prevent any adverse influence of a magnetic line of force from the outside.

Supporters 11a and 11b for supporting the cores are held between the core 2 and the magnetic cover 9a and between the core 3 and the magnetic cover 9b, respectively. Each of the supporters 11a and 11b is made of a non-magnetic material. The supporters 11a and 11b have projections, which hold the cores 2 and 3 on both sides so as to support the cores, respectively. Here, a resin or the like may be securely filled in a space defined between the projections formed at the supporters 11a and 11b and the cores 2 and 3, respectively.

A magnetic field is generated when the coils 7a, 7b, 8a and 8b constituting the exciting coil 300 are energized, so that the resultant magnetic lines of force permeate the cores 2 and 3 and the magnetic covers 9a and 9b. The magnetic lines of force in the coils 7a and 7b are generated in a direction traverse to the gap G and the sheet 10 or the like within the gap G in which the cores 2 and 3 face to each other, as indicated by, for example, arrows A in FIG. 1. In the same manner, the magnetic lines of force in the coils 8a and 8b are generated in directions indicated by arrows B1, B2, C1 and C2.

As a consequence, when the exciting coil 300 is energized, an annular magnetic path through which the magnetic lines of force pass is constituted by a magnetic channel passing along the arrows A, the core 3, the arrow C1, the magnetic cover 9b, an arrow D1, the magnetic cover 9a, the arrow B1 and the core 2 and another magnetic channel passing along the arrows A, the core 3, the arrow C2, the magnetic cover 9b, an arrow D2, the magnetic cover 9a, the arrow B2 and the core 2. The magnetic lines of force pass the respective detecting cores 2a and 3a of the cores 2 and 3, thereby generating an induction voltage in each of the first coil 100 and the second coil 200.

When the sheet 10 or the like, which has been subjected to a printing operation with a magnetic ink, is inserted into the gap G defined between the cores 2 and 3, the distribution of the magnetic lines of force in the gap G is varied. Consequently, the induction voltages in the first coil 100 and the second coil 200 are varied. A distance of each of the magnetic paths of the magnetic lines D1 and D2 of force, that is, a distance between the magnetic covers 9a and 9b is greater than the gap G defined between the cores 2 and 3, and therefore, magnetic fluxes are much leaked. As a result, annular magnetic fluxes on the magnetic lines D1 and D2 of force are reduced in quantity with few variation in magnetic line of force caused by the sheet 10 or the like and few variation in induction voltage in the second coil 200. The first coil 100 detects a part of the magnetic powder staying within the gap G between the first end portions of the detecting cores 2a and 3a out of the magnetic powder contained in the magnetic ink adhering onto the sheet 10 or the like.

When the sheet 10 or the like is moved in the direction indicated by the arrow E, the magnetic ink distributed along the movement direction E is detected as a variation in induction voltage in the first coil 100 accompanying a variation in quantity of the magnetic ink within the gap G.

On the other hand, when a temperature around the detecting unit 1 is varied, magnetic permeability of each of the cores 2 and 3 is varied, thereby varying the induction voltages of the first coil 100 and the second coil 200. Temperatures around the first coil 100 and the second coil 200 are substantially equal to each other, and therefore, the variations in induction voltage caused by the variations in temperature also are substantially equal to each other. As a consequence, the variation in induction voltage caused by the temperature can be eliminated by taking a difference in induction voltage between the first coil 100 and the second coil 200, thus taking only the variation in induction voltage generated by the magnetic material.

Figure 4:
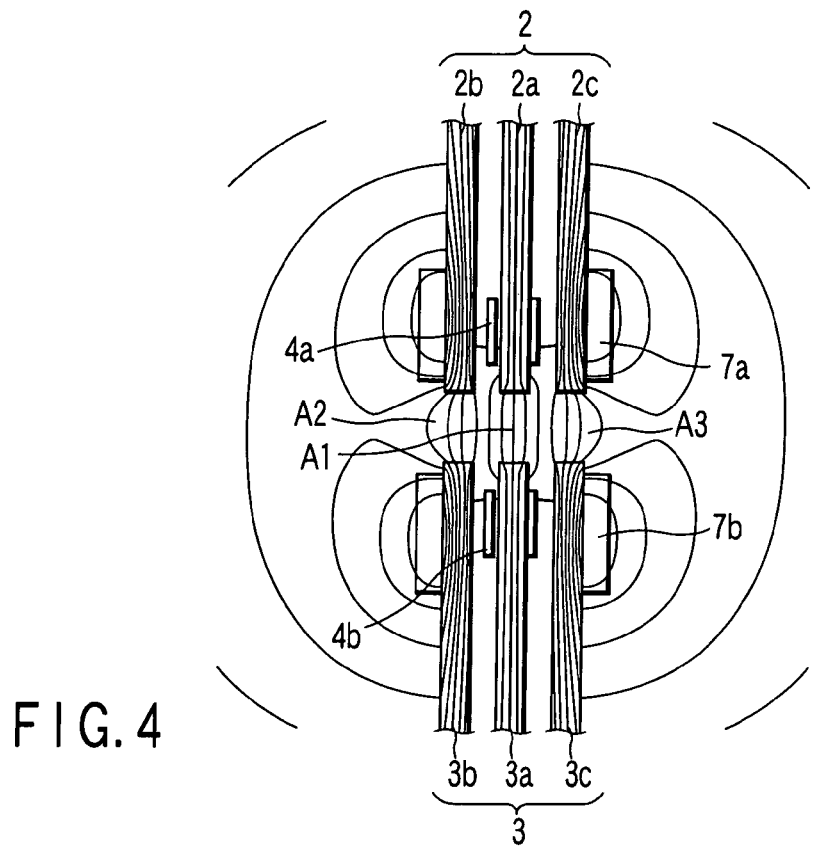
FIG. 4 is a diagram illustrating the distribution of magnetic lines of force in the detecting unit.

Next, explanation will be made on an influence on the detection sensitivity caused by the positional fluctuation of the sheet 10 or the like within the gap G defined between the cores 2 and 3. FIG. 4 is a simulation diagram illustrating the distribution state of the magnetic lines of force in the vicinity of the gap G between the first end portions 12a and 13a of the cores 2 and 3. The converging cores 2b and 3b and the converging cores 2c and 3c are arranged on both sides of the detecting cores 2a and 3a, respectively. As a consequence, within the gap G, magnetic lines A1 of force passing through the detecting cores 2a and 3a can be restricted from being widened along a direction parallel to the conveying direction E of the sheet 10 or the like, that is, along a direction parallel to the lamination direction of the detecting cores and the converging cores by the effect of magnetic lines A2 of force passing through the converging cores 2b and 3b and magnetic lines A3 of force passing through the converging cores 2c and 3c. In this manner, the magnetic lines A1 of force passing through the detecting cores 2a and 3a are substantially parallel to each other, and this signifies that the density of the magnetic fluxes in the gap G is constant. Consequently, the influence on the magnetic line of force by the magnetic material becomes identical at any position within the gap G, and a signal to be detected by the first coil 100 and the detection sensitivity cannot be influenced by the position.

As described above, the converging cores 2b and 3b, the converging cores 2c and 3c and the exciting coil 300 restrict the magnetic field detected between the detecting cores 2a and 3a, that is, the magnetic lines A1 of force from being widened, and further, constitute a convergent magnetic field generating unit for generating a convergent magnetic field which converges toward the center.

Figure 5:
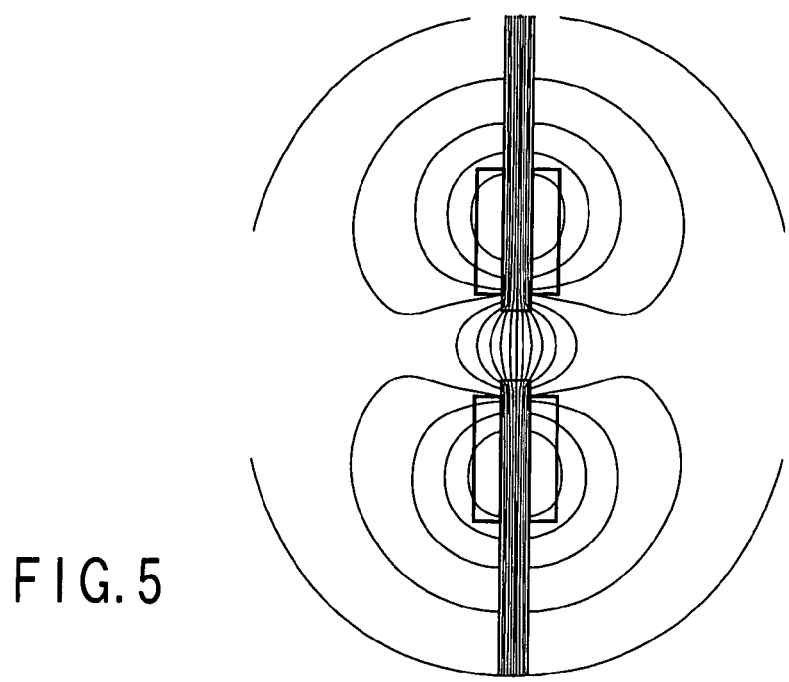
FIG. 5 is a diagram illustrating the distribution of magnetic lines of force in a conventional detecting unit.

FIG. 5 illustrates a simulation of the distribution of magnetic lines of force in a gap at which cores face to each other in a conventional detecting unit as a comparison example. The magnetic lines of force in the gap are arcuately widened outward, and the density of magnetic fluxes depends on a position of a magnetic material in the gap. For this reason, an influence by the magnetic material staying in the gap also depends on a position of the magnetic material in the gap. Therefore, a signal to be detected by a detecting coil arranged at an end of a core and detection sensitivity depend on the position of the magnetic material. The density of magnetic lines of force is high, the influence by the magnetic material is large, and the detection sensitivity is high at a position near the end of the core in the gap. To the contrary, the density of magnetic lines of force is low at the center, and therefore, the density of magnetic fluxes also is low, so that the influence by the magnetic material is small and the detection sensitivity is low.

The configuration and operation of the detecting unit 1 have been described above. However, a similar effect in the above-described embodiment can be kept even if the directions A, D1, D2 and B1, B2, C1, C2 of the magnetic lines of force on the magnetic paths are reverse, or both or either of the directions B1, B2 and C1, C2 of the magnetic lines of force may be reverse to the directions A, D1, D2 of the magnetic lines of force.

The cores 2 and 3 may be made of a magnetic material other than the amorphous foil. However, the use of a material having a high magnetic permeability such as the amorphous foil can suppress the magnetic lines of force from being widened, and can enlarge the gap G defined between the cores 2 and 3. Although the exciting coil 300 has been constituted of the coils 7a, 8a, 7b and 8b wound at both ends of the converging coils, it may be constituted of coils wound around only intermediate portions of the converging coils.

In order to inhibit any reduction of the detection sensitivity to the magnetic material in the gap G defined between the cores 2 and 3, it is preferable that a distance w between each of the cores 2 and 3 and each of the magnetic covers 9a and 9b should be set to be the gap G or greater, a distance Q between each of the respective first end portions 12a and 13a of the cores 2 and 3 and each of the ends of the magnetic covers 9a and 9b should be set to be the gap G or greater, and a distance k between the ends of the upper and lower magnetic covers 9a and 9b should be set to be the gap G or greater.

As shown in FIG. 2, the lateral width m of each of the cores 2 and 3 is set twice or more the thickness t. Each of the cores 2 and 3 has a predetermined width in the direction perpendicular to the movement direction E of the sheet 10 or the like, thereby reducing the thickness t. Accordingly, the thickness of the magnetic lines of force is reduced, so that the variation of the distribution of the magnetic material in the movement direction can be detected with a high accuracy. The detecting coils 4a and 4b are arranged in the vicinity of the first end portions of the cores 2 and 3, thereby detecting the fluctuation of the magnetic lines A1 of force at the first end portions. It is desirable that the length L of each of the cores 2 and 3 is set to be the gap G or greater in order to reduce the adverse influence by the magnetic fields at the second end portions 12b and 13b of the cores 2 and 3.

Figure 6:
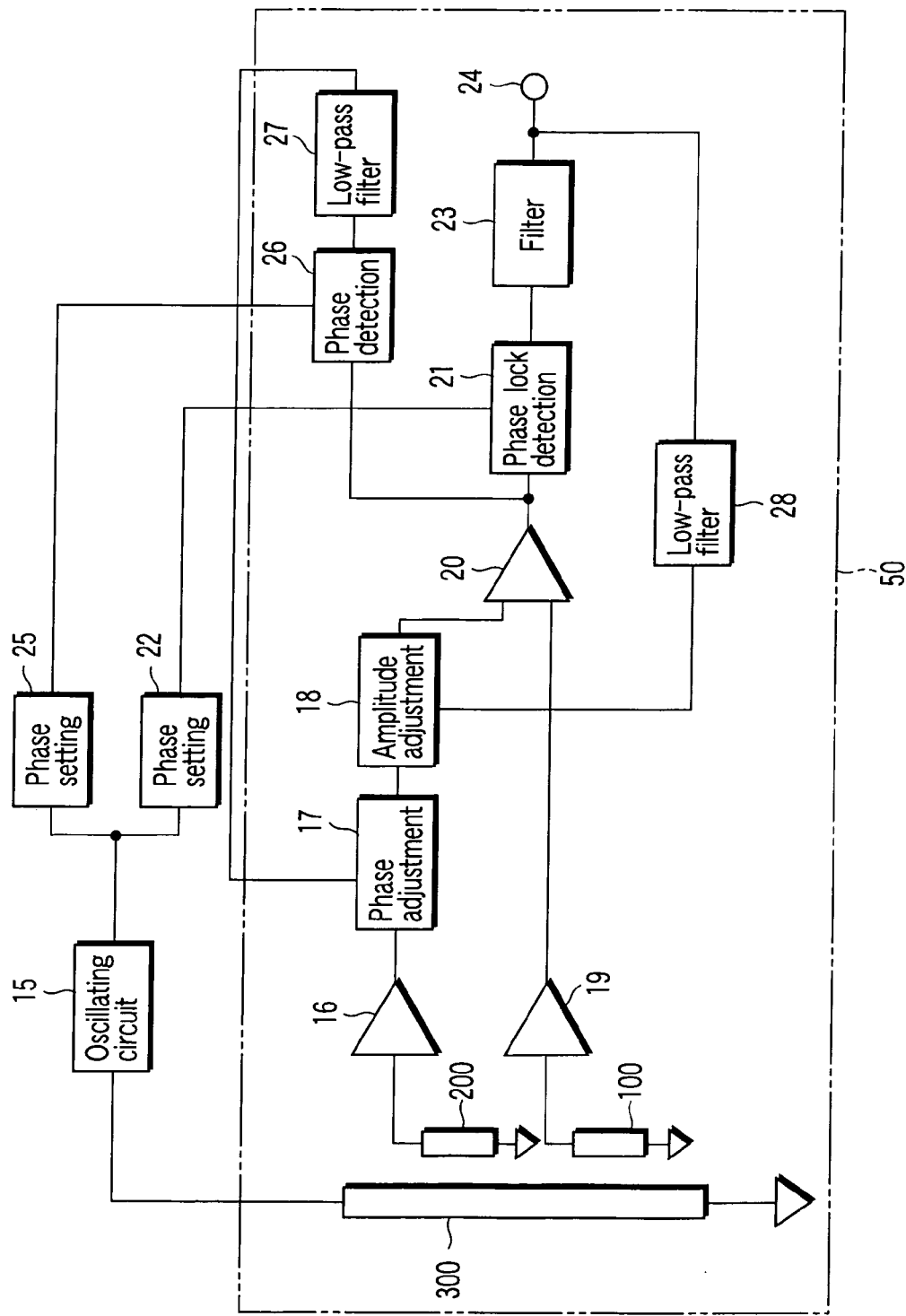
FIG. 6 is a block diagram schematically illustrating a signal processing circuit in the detecting unit.

The magnetic material detecting apparatus comprises a signal processing circuit for processing a signal in the detecting unit 1. As illustrated in FIG. 6, the signal processing circuit includes an oscillating circuit 15 for producing a signal for use in energizing the exciting coil 300. The oscillating circuit 15 is connected to a phase synchronous detection circuit 21 via a phase setting circuit 22. The second coil 200 is connected to one of input terminals of a differential amplifier 20 via an amplifier 16, a phase adjusting circuit 17 and an amplitude adjusting circuit 18. The first coil 100 is connected to the other input terminal of the differential amplifier 20 via an amplifier 19. An output terminal of the differential amplifier 20 is connected to a circuit output 24 through the phase synchronous detection circuit 21 and a low-pass filter circuit 23.

When the oscillating circuit 15 energizes the exciting coil 300 at an AC, the induction voltages are generated in the first coil 100 and the second coil 200 via the cores 2 and 3. In a state in which no sheet 10 or the like stays in the gap G defined between the respective first end portions 12a and 13a of the cores 2 and 3, adjustment will be carried out as follows:

A detection signal from the first coil 100 is amplified by the amplifier 19 to be input into one of the input terminals of the differential amplifier 20. A detection signal from the second coil 200 is amplified by the amplifier 16, and then matched in phase with an output signal from the amplifier 19 as an amplified signal of the first coil 100 by the phase adjusting circuit 17. The phase adjusting circuit 17 is adapted to adjust a phase of an input signal upon receipt of a voltage signal as a control input, and includes a variable resistor of a photo-coupler, a capacitor, an operational amplifier and the like. A variable capacitance diode and a constant resistor in place of the photo-coupler may exhibit a similar function.

Furthermore, the amplitude adjusting circuit 18 matches the above-described signal in amplitude with the output signal from the amplifier 19, thereby outputting it as another input into the differential amplifier 20. The amplitude adjusting circuit 18 functions to adjust an amplitude of an input signal by varying the amplitude of the amplifier upon receipt of a voltage signal as a control input. The amplitude adjusting circuit 18 includes a variable resistor and a constant resistor of a photo-coupler, an operational amplifier and the like, or a commercial variable gain operational amplifier, etc. The input signals at both of the terminals are equal in phase and amplitude to each other, and thus, an output signal from the differential amplifier 20 becomes almost zero.

When the magnetic material such as the magnetic ink is inserted into the gap G between the respective first end portions 12a and 13a of the cores 2 and 3 after the adjustment as described above, the induction voltage at the first coil 100 is increased. As a consequence, the output signal from the differential amplifier 20 is varied, so that an AC waveform is output. The phase synchronous detection circuit 21 functioning as smoothing means detects and rectifies the output signal from the differential amplifier 20 at a phase set by the phase setting circuit 22.

The phase setting circuit 22 transmits to the phase synchronous detection circuit 21 a signal shifted by the phase set with respect to the input waveform in the oscillation circuit 15. A phase of an energized AC signal is set at the set phase in such a manner that an output signal from the phase synchronous detection circuit 21 becomes maximum with respect to a signal in accordance with the magnetic material when, for example, the medium to be detected is placed in the detecting unit 1. Here, the phase setting may be carried out such that a noise component signal deleterious to the detection signal becomes minimum. The filter circuit 23 smoothes the AC detection signal detected and rectified in the phase synchronous detection circuit 21, thereby producing a DC signal. Incidentally, the filter circuit 23 may have the function of varying a voltage level of an output signal.

A low-pass filter 28 connected between the amplitude adjusting circuit 18 and the circuit output 24 outputs a frequency of a slow cycle such as a temperature drift. Another phase setting circuit 25 connected to the oscillation circuit 15 in parallel to the phase setting circuit 22 shifts a phase by 90° in comparison with the phase set value set in the phase setting circuit 22. The phase setting circuit 25 is connected to the output terminal of the differential amplifier 20 via a phase detection 26. The phase detection 26 detects a signal of a lowest sensitivity to the magnetic material in response to the output signal from the differential amplifier 20.

The phase detection 26 is connected to the phase adjusting circuit 17*a* via another low-pass filter 27. The low-pass filter 27 outputs a frequency of a slow cycle in the same manner as the other low-pass filter 28. The phase detection signal having the highest sensitivity to the magnetic material and the phase detection signal having the phase shifted by 90° are fed back to the phase adjusting circuit 17 and the amplitude adjusting circuit 18, so that the output from the differential amplifier 20 functions to become zero with respect to a low frequency. Thus, it is possible to compensate for the fluctuation of the circuit output 24 at a slow cycle caused by a change in temperature or the like.

Figure 7:
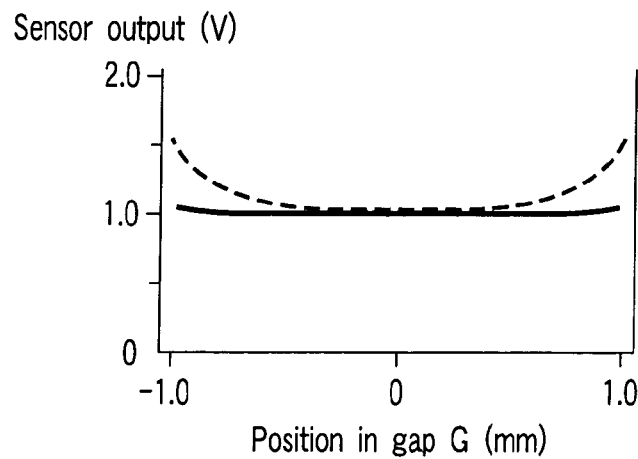
FIG. 7 is a graph illustrating detection characteristics of the detecting unit in comparison with detection characteristics of the conventional detecting unit.

FIG. 7 is a graph illustrating the relationship between the detection signal and the passing position of the sheet, which passes through the gap G and has been printed with the magnetic ink, the graph being obtained by combining the detecting unit shown in FIG. 1 with the circuit configuration illustrated in FIG. 6. The position in the gap G is represented by 0 at the center of the gap, "−" downward and "+" upward, and further, the output signal (V) from the detecting unit 1 at the passing position is expressed on a vertical axis. Here, a solid line designates the detection output signal in the detecting apparatus according to the present embodiment, and a broken line designates a detection signal in the conventional detecting unit including the cores illustrated in FIG. 5.

In the conventional detecting unit, the detection signal at a position in a gap G is increased by about 50% at a position near a core end more than at the center in the gap. To the contrary, in the magnetic material detecting apparatus according to the present embodiment, the detection signal in the detecting unit at the position in the gap G is fluctuated at 10% or less, and therefore, is substantially constant at any position in the gap.

In the magnetic material detecting apparatus such configured as described above, the respective first end portions of the two cores 2 and 3 face to each other, and the magnetic field is generated inside of the gap between the cores by energizing the coils wound around the cores at the AC. The detection magnetic field between the detecting cores at the center is converged by the magnetic field generated between the converging cores arranged outward, to be thus suppressed from being enlarged. For this reason, the detection magnetic field can have the substantially constant density of the magnetic fluxes irrespective of the position in the gap. As a consequence, the detection signal from the first coil wound around the detecting core is hardly fluctuated caused by the position of the magnetic material in the gap. Thus, the magnetic material can be detected with the constant detection sensitivity even without any contact.

The gap, at which the cores face to each other, outputs the detection signal with the sensitivity to the magnetic material, but the ends on the opposite side hardly sense the magnetic material owing to the distance from the magnetic material. Therefore, the fluctuation caused by the temperature can be canceled by taking the difference in induction voltage between the coils, thus producing the signal in proportion to the quantity of the magnetic material.

Subsequently, a description will be given of a magnetic material detecting apparatus according to a second embodiment of the present invention.

Figure 8:
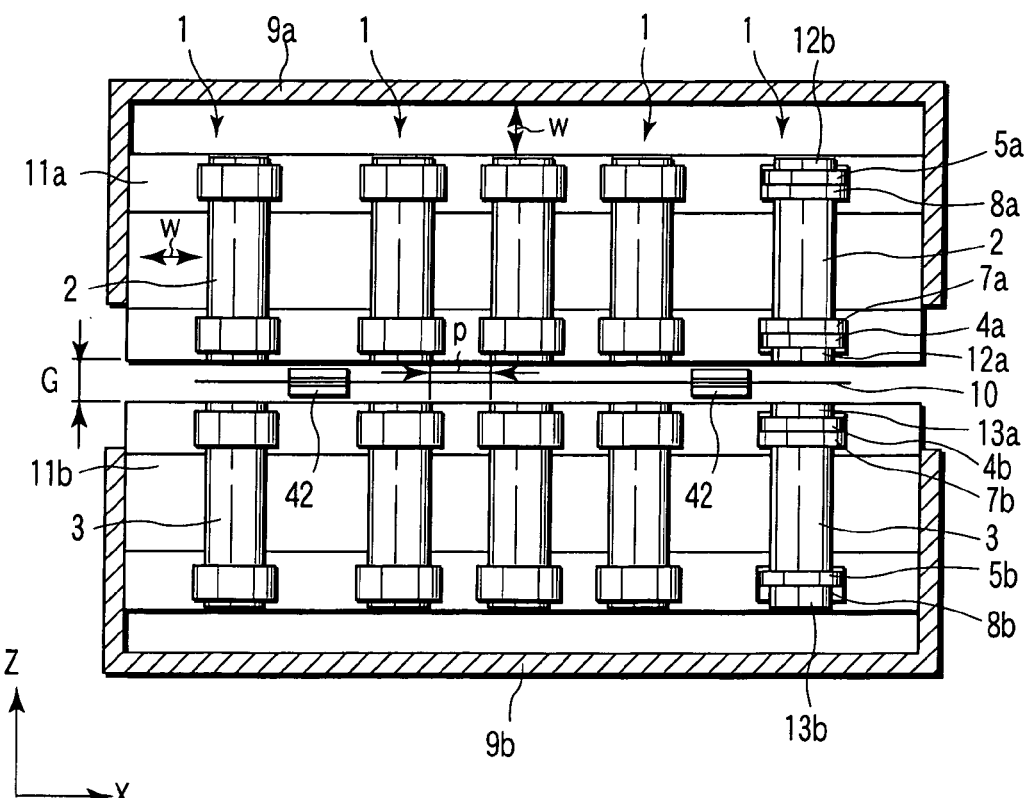
FIG. 8 is a front view schematically showing the configuration of a magnetic material detecting apparatus according to a second embodiment of the present invention, although partly omitted.

As shown in FIG. 8, a magnetic material detecting apparatus according to the embodiment is constituted of a plurality of, for example, five detecting units 1 shown in FIG. 1 arranged in parallel to one another. Each of the detecting units 1 has a pair of cores 2 and 3. The plurality of detecting units 1 are arranged in a longitudinal direction of a sheet 10 or the like such that lines connecting respective first end portions 12*a* and 13*a* of the cores 2 and 3 are parallel to each other. In addition, the plurality of detecting units 1 are arranged in a direction perpendicular to a conveying direction of the sheet 10 or the like, and a gap defined between the cores continuously extends. Since the configuration of each of the detecting units 1 is identical to that in the above-described embodiment, the same component parts are designated by the same reference numerals, and a duplicated explanation will be omitted below.

More specifically, each of the cores 2 is constituted by laminating a detecting core 2*a* and converging cores 2*b* and 2*c* positioned on both sides of the detecting core 2*a*, and further, coils 4*a* and 5*a* are wound around both ends of the detecting core. Coils 7*a* and 8*a* are wound around both ends of each of the converging cores 2*b* and 2*c*. In the same manner, each of the cores 3 is constituted by laminating a detecting core 3*a* and converging cores 3*b* and 3*c* positioned on both sides of the detecting core 3*a*, and further, coils 4*b* and 5*b* are wound around both ends of the detecting core. Coils 7*b* and 8*b* are wound around both ends of each of the converging cores 3*b* and 3*c*. The cores 2 and 3 face to each other with a gap G held therebetween.

A magnetic cover 9*a* is provided in such a manner as to surround the coils 5*a* and 8*a* wound around the five cores 2. Another magnetic cover 9*b* is provided in such a manner as to surround the coils 5*b* and 8*b* wound around the five cores 3. Supporters 11*a* and 11*b* for supporting the cores are held between the cores 2 and 3 and the magnetic covers 9*a* and 9*b*, respectively. Each of the supporters is made of a non-magnetic material. The supporters 11*a* and 11*b* have a plurality of projections, which hold the cores 2 and 3 on both sides so as to support the cores, respectively. Here, a resin or the like may be securely filled in a space defined between the projections of the supporters 11*a* and 11*b* and the cores 2 and 3, respectively.

It is preferable that an interval between the adjacent detecting units 1, in particular, an interval p between the adjacent cores 2 and another interval p between the adjacent cores 3 are set to be equal to or greater than the gap G defined between the respective first end portions 12*a* and 13*a* of the cores 2 and 3 in order to reduce a mutual interference between the adjacent detecting units 1. Additionally, it is desirable that distances w between the cores 2 and 3 and the magnetic covers 9*a* and 9*b*, respectively, are greater than the gap G.

The sheet 10 or the like serving as a medium to be detected is held at both ends in a longitudinal direction on both sides by a conveying belt 42, and is conveyed through the gap G in a direction perpendicular to the surface of the sheet.

Figure 9:
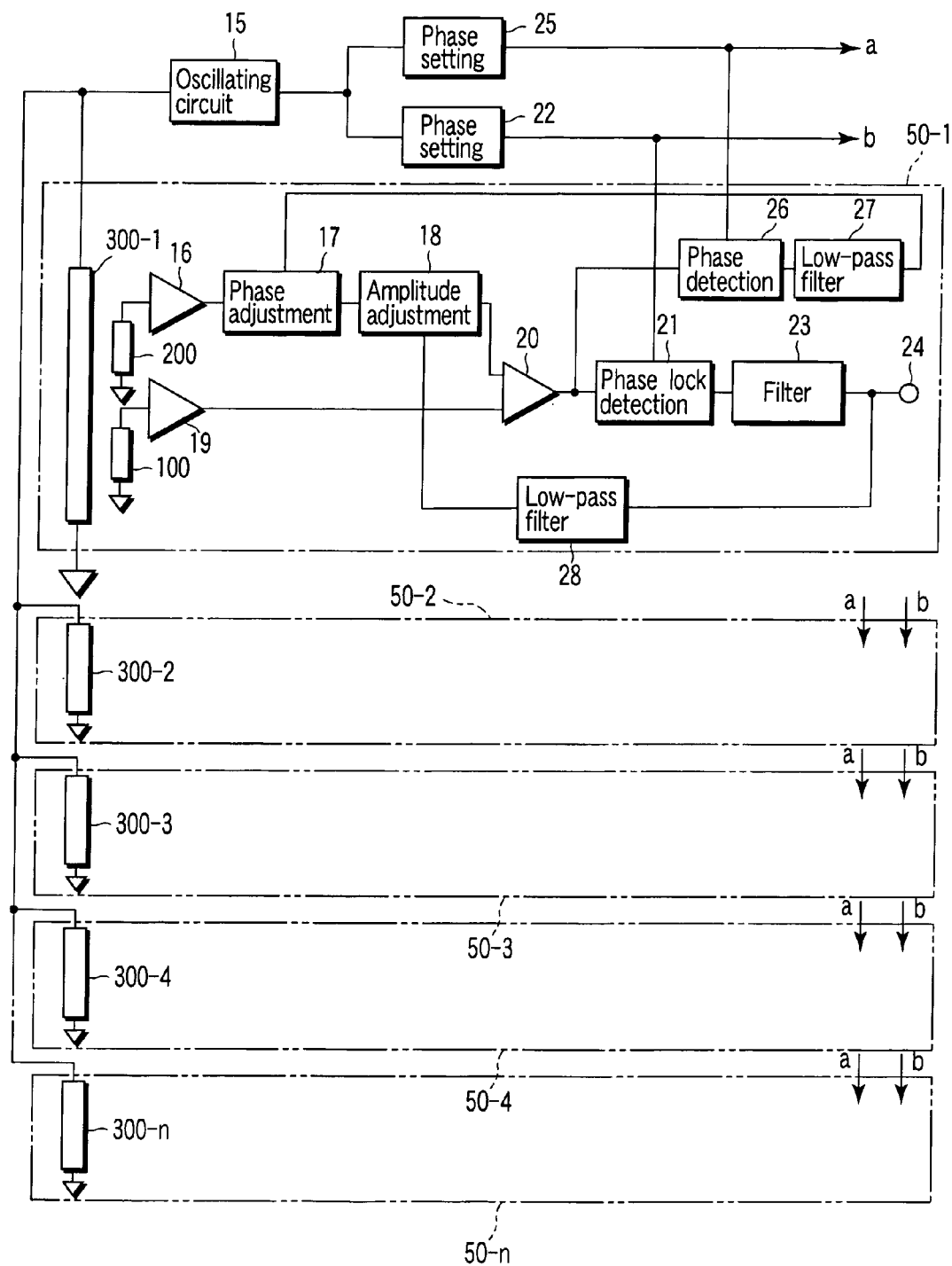
FIG. 9 is a block diagram schematically illustrating a signal processing circuit in the magnetic material detecting apparatus according to the second embodiment.

As illustrated in FIG. 9, the magnetic material detecting apparatus includes n exciting coils 300-1, 300-2, 300-3, 300-4, . . . and 300-*n*, each of which is constituted by connecting the coils 7*a*, 8*a*, 7*b* and 8*b* wound around the n pairs of cores 2 and 3, respectively, in series to each other. In a signal processing circuit in the magnetic material detecting apparatus, the exciting coils 300-1, 300-2, 300-3, 300-4, . . . and 300-*n* are connected in parallel to one another, to be energized.

The signal processing circuit includes n circuit units 50-1, 50-2, 50-3, 50-4, . . . and 50-*n* arranged in a manner corresponding to the n pairs of cores 2 and 3. Each of the circuit units has the same configuration as a circuit unit 50 surrounded by a chain double-dashed line in the signal processing circuit illustrated in FIG. 6. The signal processing circuit includes an oscillation circuit 15 for producing a signal for energizing the exciting coil 300. The oscillation circuit 15 is connected in parallel to the exciting coils 300-1, 300-2, 300-3, 300-4, . . . and 300-*n*. Furthermore, the oscillation circuit 15 is connected to both of phase setting circuits 22 and 25. An output "a" from the phase setting circuit 22 and another output b from the other phase setting circuit 25 are connected to a phase detection 26 and a phase synchronous detection circuit 21 in each of the circuit units 50-1, 50-2, 50-3, 50-4, . . . and 50-*n*, respectively. With the above-described configuration, a detection signal can be produced in each of the pairs of cores.

Next, a description will be given of a magnetic material detecting apparatus according to a third embodiment of the present invention.

Figure 10:
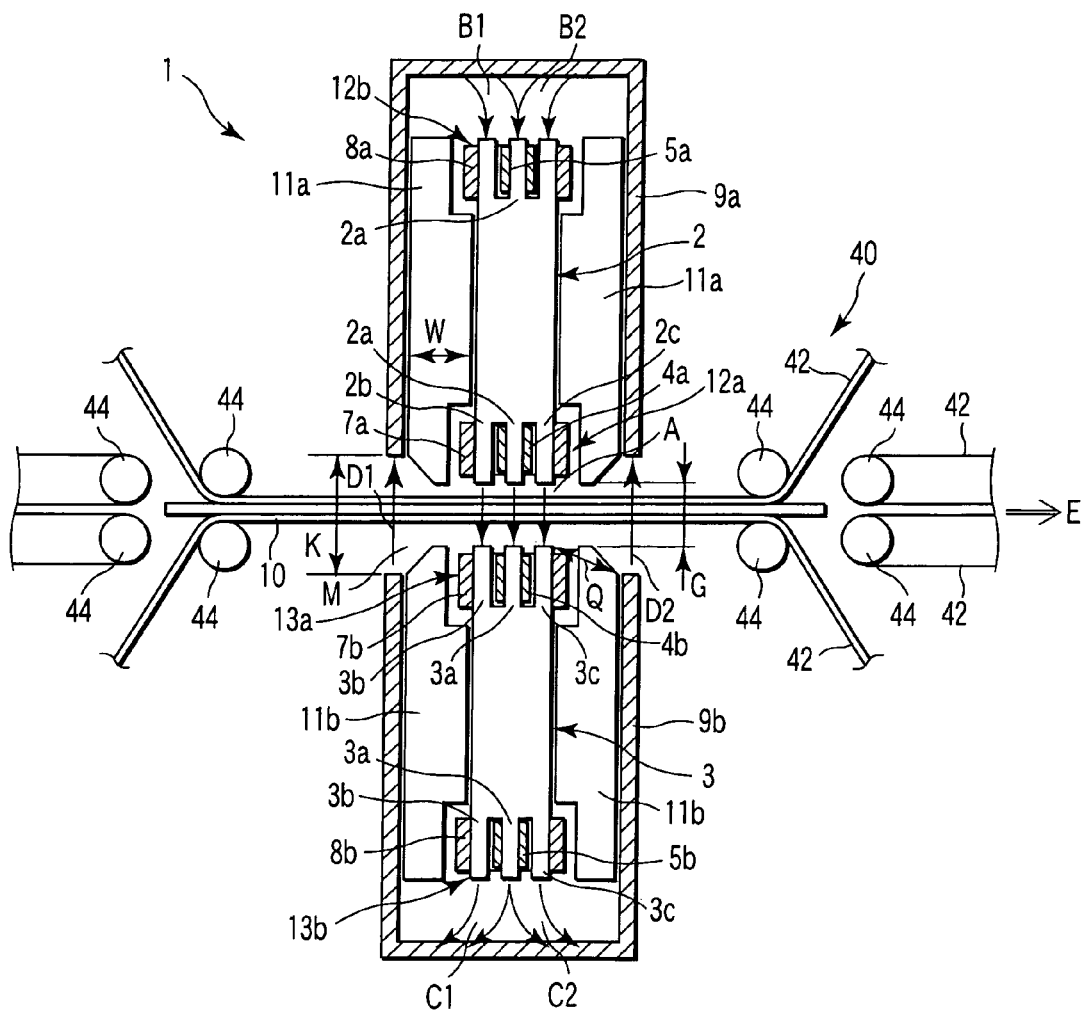
FIG. 10 is a cross-sectional view showing the configuration of a magnetic material detecting apparatus according to a third embodiment of the present invention.
Figure 11:
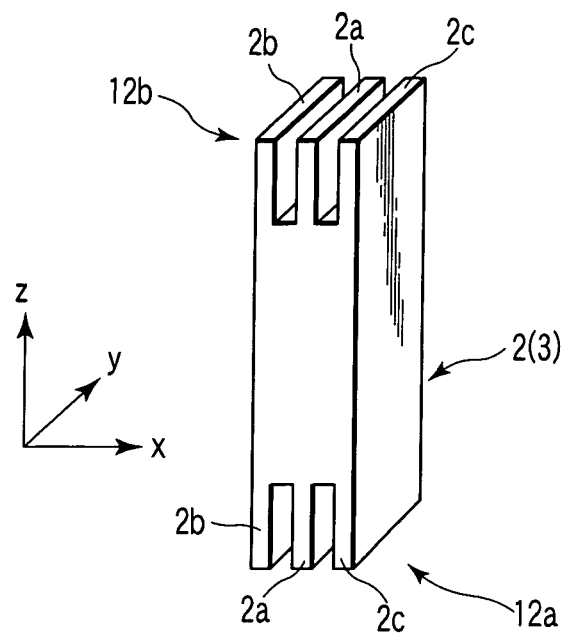
FIG. 11 is a perspective view showing the contour of a core constituting a detecting unit in the magnetic material detecting apparatus according to the third embodiment.

As shown in FIGS. 10 and 11, a detecting core and converging cores are integrated with one another by using magnetic ferrite or the like in each of cores 2 and 3 in the present embodiment. More specifically, the core 2 is formed into an elongated and rectangular shape, and has a first end portion 12*a* and a second end portion 12*b* on an opposite side. The first end portion 12*a* in the core 2 is cut out at two portions, and thus, is formed into a comb shape. As a result, three plate-shaped ends extending in parallel to one another with intervals thereamong are formed at the first end portion 12*a*. Here, a center end constitutes a detecting core 2*a*, and ends on both sides constitute converging cores 2*b* and 2*c*, respectively. In the same manner, three plate-shaped ends extending in parallel to one another with intervals thereamong are formed at the second end portion 12*b*. Here, a center end constitutes a detecting core 2*a*, and ends on both sides constitute converging cores 2*b* and 2*c*, respectively.

The core 3 is formed in the same manner as the core 2. Three plate-shaped ends extending in parallel to one another with intervals thereamong are formed at the first end portion 13*a* of the core 3. Here, a center end constitutes a detecting core 3*a*, and ends on both sides constitute converging cores 3*b* and 3*c*, respectively. In the same manner, three plate-shaped ends extending in parallel to one another with intervals thereamong are formed at the second end portion 13*b* of the core 3. Here, a center end constitutes a detecting core 3*a*, and ends on both sides constitute converging cores 3*b* and 3*c*, respectively.

As shown in FIG. 10, coils 4*a* and 4*b* are wound around the center detecting cores 2*a* and 3*a*, respectively, at the first end portions 12*a* and 13*a* of the cores 2 and 3. Coils 5*a* and 5*b* are wound around the center detecting cores 2*a* and 3*a*, respectively, at the second end portions 12*b* and 13*b* of the cores 2 and 3. The respective coils 4*a* and 4*b* at the first end portions are connected in series to each other, thereby constituting a first coil 100. The respective coils 5*a* and 5*b* at the second end portions are connected in series to each other, thereby constituting a second coil 200.

Coils 7*a* and 7*b* are wound around the converging coils 2*c* and 2*b* at the first end portions 12*a* and 13*a* of the cores 2 and 3, respectively. Coils 8*a* and 8*b* are wound around the converging coils 2*c* and 2*b* at the second end portions 12*b* and 13*b* of the cores 2 and 3, respectively. Here, the coils 7*a*, 7*b*, 8*a* and 8*b* are connected in series to each other, thereby constituting an exciting coil 300 functioning as exciting means.

Magnetic covers 9*a* and 9*b* are made of a magnetic material, and are provided in such a manner as to surround at least the second end portions of the cores 2 and 3, the coils 5*a* and 5*b*, and the coils 8*a* and 8*b*, respectively. In this manner, the magnetic covers 9*a* and 9*b* can prevent any adverse influence of a magnetic line of force from the outside.

Supporters 11*a* and 11*b* for supporting the cores are held between the core 2 and the magnetic cover 9*a* and between the core 3 and the magnetic cover 9*b*, respectively. Each of the supporters 11*a* and 11*b* is made of a non-magnetic material. The supporters 11*a* and 11*b* have projections, which hold the cores 2 and 3 on both sides so as to support the cores, respectively. Here, a resin or the like may be securely filled in a space defined between the projections of the supporters 11*a* and 11*b* and the cores 2 and 3, respectively.

A magnetic field is generated when the coils 7*a*, 7*b*, 8*a* and 8*b* constituting the exciting coil 300 are energized, so that the resultant magnetic lines of force permeate the cores 2 and 3 and the magnetic covers 9*a* and 9*b*. The magnetic lines of force in the coils 7*a* and 7*b* are generated in a direction traverse to a gap G and the sheet 10 or the like within the gap G in which the cores 2 and 3 face to each other, as indicated by, for example, arrows A in FIG. 10. In the same manner, the magnetic lines of force in the coils 8*a* and 8*b* are generated in a direction indicated by arrows B1, B2, C1 and C2.

As a consequence, when the exciting coil 300 is energized, an annular magnetic path through which the magnetic lines of force pass is constituted by a magnetic channel passing along the arrows A, the core 3, the arrow C1, the magnetic cover 9*b*, an arrow D1, the magnetic cover 9*a*, the arrow B1 and the core 2 and another magnetic channel passing along the arrows A, the core 3, the arrow C2, the magnetic cover 9*b*, an arrow D2, the magnetic cover 9*a*, the arrow B2 and the core 2. The magnetic lines of force pass the respective detecting cores 2*a* and 3*a* of the cores 2 and 3, thereby generating an induction voltage in each of the first coil 100 and the second coil 200.

When the sheet 10 or the like which has been subjected to a printing operation with a magnetic ink, is inserted into the gap G defined between the cores 2 and 3, the distribution of the magnetic lines of force inside of the gap G is varied. Consequently, the induction voltage in the first coil 100 and the second coil 200 is varied. A distance of each of the magnetic paths of the magnetic lines D1 and D2 of force, that is, a distance between the magnetic covers 9*a* and 9*b* is greater than the gap G defined between the cores 2 and 3, and therefore, magnetic fluxes are much leaked. For this reason, annular magnetic fluxes on the magnetic lines D1 and D2 of force are reduced in quantity with few variation in magnetic line of force caused by the sheet 10 or the like and few variation in induction voltage in the second coil 200. The first coil 100 detects a part of the magnetic powder staying within the gap G between the first end portions of the detecting cores 2*a* and 3*a* out of the magnetic powder contained in the magnetic ink adhering onto the sheet 10 or the like.

When the sheet 10 or the like is moved in a direction indicated by an arrow E, the magnetic ink distributed along the movement direction E is detected as a variation in induction voltage in the first coil 100 accompanying a variation in quantity of the magnetic ink within the gap G.

Since the other configuration in the third embodiment is identical to that in the above-described first embodiment, the same component parts are designated by the same reference numerals, and a detailed explanation will be omitted below.

Figure 12:
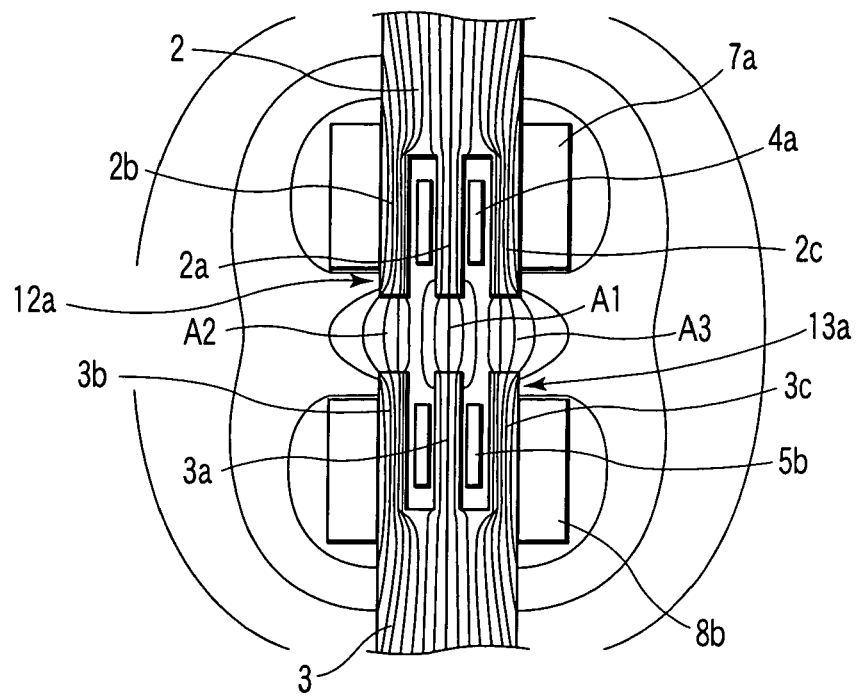
FIG. 12 is a diagram illustrating the distribution of magnetic lines of force in the detecting unit.

FIG. 12 is a simulation diagram illustrating the distribution state of the magnetic lines of force in the vicinity of the gap G between the first end portions 12a and 13a of the cores 2 and 3. The converging cores 2b and 3b and the converging cores 2c and 3c are arranged on both sides of the detecting cores 2a and 3a, respectively. As a consequence, within the gap G, magnetic lines A1 of force passing through the detecting cores 2a and 3a can be restricted from being widened along a direction parallel to the conveying direction E of the sheet 10 or the like, that is, along a direction parallel to the lamination direction of the detecting cores and the converging cores by the effect of magnetic lines A2 of force passing through the converging cores 2b and 3b and magnetic lines A3 of force passing through the converging cores 2c and 3c. In this manner, the magnetic lines A1 of force passing through the detecting cores 2a and 3a are substantially parallel to each other, and this signifies that the density of the magnetic fluxes in the gap G is constant. Consequently, the influence on the magnetic line of force by the magnetic material becomes identical at any position within the gap G, and a signal to be detected by the first coil 100 and the detection sensitivity cannot be influenced by the position.

As described above, the converging cores 2b and 3b, the converging cores 2c and 3c and the exciting coil 300 restrict the magnetic field detected between the detecting cores 2a and 2b, that is, the magnetic lines A1 of force from being widened, and further, constitute a convergent magnetic field generating unit for generating a convergent magnetic field which converges toward the center.

The third embodiment such configured as described above also can produce the same function and effect as those produced in the above-described first embodiment. Although detection sensitivity is slightly degraded if the core is made of magnetic ferrite or the like, an effect of a uniform detection sensitivity in the gap G can be produced in the same manner. Additionally, a fabrication cost can be reduced by using the cores 2 and 3 of an integral structure.

Figure 13:
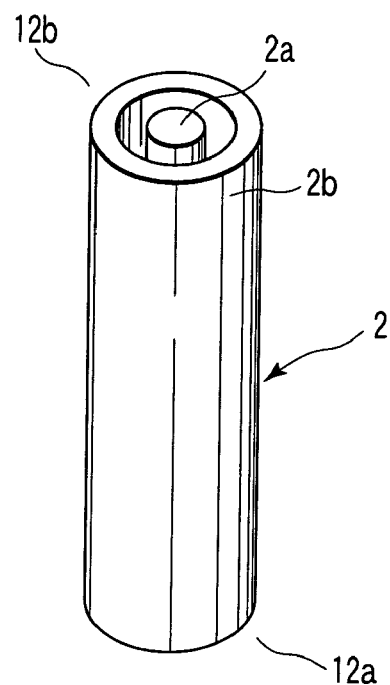
FIG. 13 is a perspective view showing the contour of a core constituting a detecting unit in a magnetic material detecting apparatus according to another embodiment of the present invention.
Figure 14A:
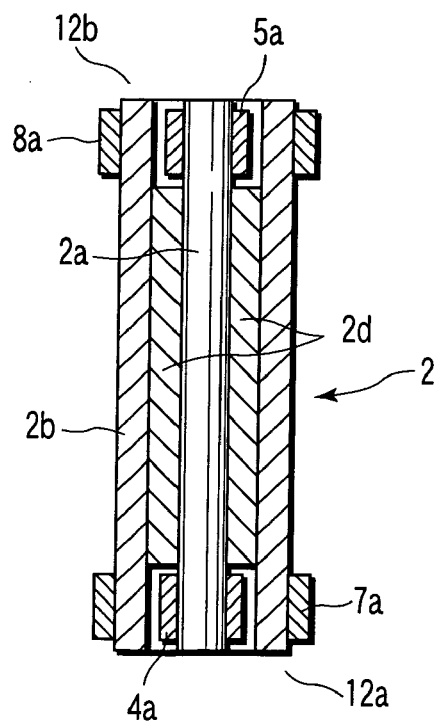
FIG. 14A is a cross-sectional view showing a core of a magnetic material detecting apparatus according to still another embodiment of the present invention.

Subsequently, a description will be given of cores in a magnetic material detecting apparatus according to other embodiments of the present invention. As shown in FIGS. 13 and 14A, each of cores 2 and 3 constituting a detecting unit includes an elongated and columnar detecting core 2a and a cylindrical converging core 2b in the present embodiment. The converging core 2b is arranged around and coaxially with the detecting core 2a while both ends are aligned with each other. A cylindrical insulating member 2d is held between the detecting core 2a and the converging core 2b, and thus, it supports the detecting core. Coils 4a and 5a are wound around both ends of the detecting core 2a, respectively. In the same manner, coils 7a and 8a are wound around both ends 12a and 12b of the converging core 2b, respectively.

Figure 14B:
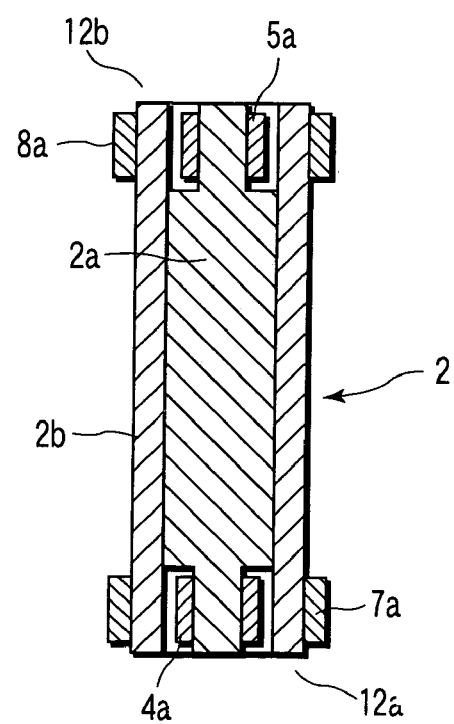
FIG. 14B is a cross-sectional view showing a core of a magnetic material detecting apparatus according to a still further embodiment of the present invention.

In still another embodiment shown in FIG. 14B, each of cores 2 and 3 constituting a detecting unit includes a columnar detecting core 2a whose both ends are stepwise tapered in a smaller diameter and a cylindrical converging core 2b. The converging core 2b is fitted around and coaxially with the detecting core 2a. Both ends of the detecting core 2a face to the converging core 2b with intervals. Coils 4a and 5a are wound around both ends of the detecting core 2a, respectively. In the same manner, coils 7a and 8a are wound around both ends of the converging core, respectively.

Distribution of magnetic lines of force in a gap G between the cores facing to each other also in the case of using the cores shown in FIGS. 13, 14A and 14B is identical to that in the above-described first embodiment. Thus, it is possible to produce the same function and effect as those produced in the first embodiment.

The present invention is not limited directly to the embodiment described above, and its components may be embodied in modified forms without departing from the spirit of the invention. Further, various inventions may be made by suitably combining a plurality of components described in connection with the foregoing embodiment. For example, some of the components according to the foregoing embodiment may be omitted. Furthermore, components according to different embodiments may be combined as required.

Although one converging core has been arranged on one side of the detecting core in the first embodiment, a plurality of converging cores may be arranged on one side of a detecting core, respectively. In this case, a convergent magnetic field generated by the converging cores can further restrict a detection magnetic field from being widened and can promote uniformity of detection sensitivity.

Otherwise, although the exciting coils have been wound at both ends of each of the converging cores in the above-described embodiments, the present invention is not limited to this. For example, at least one exciting coil may be wound around converging cores.

The medium to be detected may be not the sheet or the like but a belt-like film, etc. as long as it is a medium which is coated with a magnetic material or contains a magnetic material.

What is claimed is:

1. A magnetic material detecting apparatus comprising:
   a pair of cores each having a first end portion and a second end portion on a side opposite to the first end portion, the first end portions facing to each other with a gap through which a medium to be detected passes;
   a first coil including a pair of coils wound around the first end portion of each core and connected in series to each other;
   exciting means for generating a detection magnetic field which passes the pair of cores and the gap;
   a convergent magnetic field generating unit which generates, in the gap, a convergent magnetic field for converging the detection magnetic field in a direction perpendicular to a direction in which the first end portions of the pair of cores are connected to each other; and
   a signal processing circuit which processes a detection signal from the first coil.

2. The magnetic material detecting apparatus according to claim 1, wherein the first end portion of each of the cores includes a detecting core and two converging cores arranged on both sides of the detecting core and constituting the convergent magnetic field generating unit, and
   the pair of coils in the first coil are wound around the detecting cores at the first end portions of the cores, respectively.

3. The magnetic material detecting apparatus according to claim 2, wherein the detecting core and the two converging cores are formed into a plate shape, and are arranged opposite to one another with intervals.

4. The magnetic material detecting apparatus according to claim 3, wherein each of the detecting core and the two converging cores is formed by laminating magnetic amorphous foils.

5. The magnetic material detecting apparatus according to claim 2, wherein the detecting core and the two converging cores are formed integrally with one another by a magnetic material.

6. The magnetic material detecting apparatus according to claim 1, wherein the first end portion of each core has a detecting core and a converging core arranged around the detecting core and constituting the convergent magnetic field generating unit, and
   the pair of coils in the first coil are wound around the detecting core at the first end portion of each core.

7. The magnetic material detecting apparatus according to claim 6, wherein the detecting core is formed into a columnar shape, and the converging core is formed into a cylindrical shape and is arranged coaxially with the detecting core with an interval.

8. The magnetic material detecting apparatus according to claim 7, wherein each of the detecting core and the converging core is formed by laminating magnetic amorphous foils.

9. The magnetic material detecting apparatus according to claim 6, wherein each of the detecting core and the converging core is made of ferrite.

10. The magnetic material detecting apparatus according to claim 2, wherein the exciting means and the convergent magnetic field generating unit comprise coils which are wound around the converging core and which generate the convergent magnetic field and the detection magnetic field.

11. The magnetic material detecting apparatus according to claim 1, further comprising:
    a magnetic cover which surrounds the second end portion of each of the pair of cores and is made of a magnetic material.

12. A magnetic material detecting apparatus comprising:
    a plurality of detecting units arranged in parallel to one another in a direction perpendicular to a conveying direction of a medium to be detected;
    each of the detecting units comprising:
    a pair of cores each having a first end portion and a second end portion on a side opposite to the first end portion, the first end portions facing to each other with a gap through which a medium to be detected passes;
    a first coil wound around the first end portion of each core and having a pair of coils connected in series to each other;
    exciting means for generating a detection magnetic field which passes the pair of cores and the gap;
    a convergent magnetic field generating unit which generates, in the gap, a convergent magnetic field for converging the detection magnetic field in a direction perpendicular to a direction in which the first end portions of the pair of cores are connected to each other; and
    a signal processing circuit which processes a detection signal from the first coil,
    the detecting units being juxtaposed in such a manner that lines connecting the first end portions of the pair of cores in each detecting unit are aligned substantially in parallel to each other.

13. A magnetic material detecting apparatus according to claim 12, further comprising:
    a second coil having a pair of coils wound at the second end portion of each core and connected in series to each other,
    wherein the signal processing circuit processes a detection signal from the first coil and a detection signal from the second coil, and outputs a magnetic material detection signal.

* * * * *